UNITED STATES PATENT OFFICE.

DANIEL W. GILL, OF CHEYENNE, WYOMING.

PROCESS OF CLEANING SODA.

SPECIFICATION forming part of Letters Patent No. 725,553, dated April 14, 1903.

Application filed October 27, 1902. Serial No. 129,045. (No specimens.)

*To all whom it may concern:*

Be it known that I, DANIEL W. GILL, a citizen of the United States, residing at Cheyenne, in the county of Laramie and State of Wyoming, have invented a new and useful Process of Cleaning Soda, of which the following is a specification.

My invention is a process of cleaning natural soda; and the object of the process is to rid the soda of foreign matter and render it suitable for the manufacture of clear plate-glass or for other uses for which a pure soda is required.

Heretofore the use of such natural soda as is found in the western part of the United States has been restricted to use in glass manufacture to the inferior grades, as the foreign matter contained in the soda interfered with the production of a clear glass and soda-ash has been used in the manufacture of the finest quality of plate-glass.

While my process is applicable to all natural soda, yet the especial soda used by me in my process is shown by analysis to be as follows: sodium sulfate, ($Na_2SO_4$,) 94.50; magnesium sulfate, ($MgSo_4$,) 2.52; sodium chlorid, (NaCL,) 0.54; water, 1.61; undetermined and loss, 0.83; total, one hundred. The soda thus found is in the form of crystals, which are soluble in water and will become pulverized on continued exposure to air.

My process is as follows: The soda is dissolved in warm water and allowed to stand until the foreign matter contained in the soda has fallen to the bottom or risen to the surface, according to its specific gravity. That which rises to the surface is then drained or skimmed off, and the soda in solution is then cooled to a temperature above the freezing-point, when the soda will recrystallize and will be found free from foreign matter. The water and soda crystals are then separated in any desired manner.

Careful experimentation shows that the best results are obtained by heating the water to a temperature of 160° Fahrenheit and then permitting the temperature to fall to about 140°, and I retain this temperature until the foreign matter has separated from the soda. I then draw the solution off into another vat and recrystallize the soda at a temperature of about 50° Fahrenheit.

The soda will dissolve some and recrystallize some at other temperatures; but better results financially are secured by having the temperature as above.

An analysis of the cleaned soda has shown the following: sodium chlorid, 0.08; sodium sulfate, 99.92; water, none; total, one hundred. An analysis of this soda before cleaning has already been given.

Having thus fully described my invention, what I claim as new, and desire to secure by Letters Patent, is—

The process of cleaning natural soda which consists in dissolving the soda in water heated to a temperature of about 160° Fahrenheit, letting the temperature fall to about 140° Fahrenheit, retaining at such temperature until the foreign matter has separated from the soda, drawing same off, and recrystallizing the soda at a temperature of about 50° Fahrenheit.

DANIEL W. GILL.

Witnesses:
WILL J. ELLIOTT,
C. E. MCGARVEY.